US011139741B2

(12) United States Patent
Medina-Garcia et al.

(10) Patent No.: US 11,139,741 B2
(45) Date of Patent: Oct. 5, 2021

(54) RESONANT FLYBACK CONVERTER WITH CAPACITOR COUPLED TO GROUND

(71) Applicant: Infineon Technologies Austria AG, Villach (AT)

(72) Inventors: Alfredo Medina-Garcia, Munich (DE); Pierrick Ausseresse, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/683,460

(22) Filed: Nov. 14, 2019

(65) Prior Publication Data
US 2020/0169164 A1  May 28, 2020

(30) Foreign Application Priority Data

Nov. 23, 2018 (DE) .................... 10 2018 129 567.7

(51) Int. Cl.
*H02M 3/335* (2006.01)
*H02M 1/00* (2006.01)

(52) U.S. Cl.
CPC ... *H02M 3/33553* (2013.01); *H02M 3/33569* (2013.01); *H02M 1/0006* (2021.05)

(58) Field of Classification Search
CPC ................ H02M 3/335–42; H02M 2001/0006
See application file for complete search history.

(56) References Cited

U.S. PATENT DOCUMENTS

| 6,124,680 | A | 9/2000 | Shoji et al. | |
| 9,966,837 | B1* | 5/2018 | Seaton | H02M 1/08 |
| 2006/0119281 | A1* | 6/2006 | Nishikawa | H02M 3/3353 |
| | | | | 315/209 R |
| 2015/0162837 | A1 | 6/2015 | Duan et al. | |
| 2015/0171754 | A1 | 6/2015 | Scibilia | |
| 2016/0344293 | A1* | 11/2016 | Hari | H02M 3/33507 |
| 2017/0288556 | A1* | 10/2017 | Tang | H02M 3/33592 |
| 2019/0296649 | A1* | 9/2019 | Graves | H02M 1/34 |
| 2020/0007041 | A1* | 1/2020 | Liu | H02M 3/33507 |

FOREIGN PATENT DOCUMENTS

| DE | 10 2012 020 672 A1 | 5/2013 |
| DE | 102012020672 A1 | 5/2013 |
| DE | 10 2017 106 504 A1 | 10/2017 |
| DE | 102017106504 A1 | 10/2017 |

OTHER PUBLICATIONS

Office Action, DE 10 2018 129 567.7, dated Jun. 18, 2021, pp. 1-8.

* cited by examiner

*Primary Examiner* — Peter M Novak
(74) *Attorney, Agent, or Firm* — Armis IP Law, LLC (57) ABSTRACT

Power converters are provided. A capacitor is coupled to a primary winding of a transformer forming part of an LC resonator. The capacitor is coupled with a supply voltage input (Vcc) of a controller to supply at least part of the controller with power.

25 Claims, 6 Drawing Sheets

RESONANT FLYBACK CONVERTER WITH CAPACITOR COUPLED TO GROUND

TECHNICAL FIELD

The present application generally relates to power converters.

RELATED APPLICATION

This application is related to and claims priority to earlier filed German patent application serial number 10 2018 129567.7 entitled "POWER CONVERTER," filed on Nov. 23, 2018, the entire teachings of which are incorporated herein by this reference.

BACKGROUND

Power converters are devices which convert an electrical input power to an electrical output power and include current converters and voltage converters. Flyback converters are a type of voltage converters which provide galvanic isolation between an input and any output. A specific type of flyback converter is an asymmetric pulse-width modulation (APWM) half bridge (HB) flyback converter, referred to as APWM HB flyback converter herein. A APWM HB flyback converter is essentially a converter with an inductor of the converter being split to form a transformer, such that voltage ratios are multiplied based on a winding ratio of the transformer with an additional advantage of isolation. To operate such an APWM HB flyback converter, a half bridge comprising a high-side switch and a low-side switch is operated by pulse-width modulated signal to selectively provide energy to the transformer. Driving of the high-side switch and low-side switch is controlled by a controller, which may comprise a correspondingly programmed processor, specific hardware like an application specific integrated circuit (ASIC) or a field programmable gate array (FPGA) or other logic circuits, and driver circuits to provide driving signals to the switches.

Such a controller needs to be supplied with electrical power to perform its function. For example, the above-mentioned processors, ASICs, FPGAs or other logic circuits as well as drivers need to be supplied with a supply voltage to be able to operate. In some previous implementations, the above-mentioned transformer is provided with an auxiliary winding, and a supply voltage supplying the controller is derived from a voltage at such an auxiliary winding.

However, such an auxiliary winding requires space and causes manufacturing costs. In other implementations, which operate at different output voltages, a plurality of auxiliary windings may need to be used to provide a correct supply voltage to the controller for different output or input voltages.

BRIEF DESCRIPTION

A power converter as defined in claim 1 is provided. The dependent claims define further embodiments.

According to an embodiment, a power converter is provided, comprising:
at least one primary side switch,
a transformer, wherein a primary winding of the transformer is coupled to the at least one primary side switch, and wherein a secondary winding of the transformer is coupled to an output of the power converter,
a capacitor coupled to the primary winding, wherein an LC resonator of the power converter includes the capacitor and a leakage inductivity of the transformer, and
a controller operative to control switching of the at least one primary side switch, wherein the controller includes a supply voltage terminal operative to receive a supply voltage supplying at least part of the controller with power, wherein the supply voltage terminal is coupled to the capacitor.

The above summary is merely intended to give a brief overview over some aspects of some embodiments and is not to be construed as limiting. In particular, other embodiments may include other features than the ones explicitly given above.

DETAILED DESCRIPTION

In the following, various embodiments will be described in detail referring to the attached drawings. These embodiments are given as examples only and are not to be construed as limiting in any way. For example, while embodiments may be described comprising a plurality of features or elements, this is not be construed as limiting, and in other embodiments, some of the features or elements may be omitted, and/or may be replaced by alternative features or elements. In addition to the features or elements explicitly shown and described, further features or elements, for example features or elements conventionally provided in power converters like asymmetric pulse-width modulation half bridge (APWM HB) flyback converter circuits, like protection mechanisms (for example overcurrent protection) or feedback control may be employed.

Different embodiments may be combined with each other to form further embodiments unless noted otherwise. Variations and modifications described with respect to one of the embodiments may also be applied to other embodiments.

In the embodiments shown and described, any direct electrical connection or coupling between elements, i.e. connections or couplings without intervening elements, may be replaced by an indirect connection or coupling, i.e. a connection or coupling comprising one or more additional intervening elements, and vice versa, as long as the general purpose of the connection or coupling, for example to provide a certain kind of signal, a certain kind of information or a certain kind of control, is essentially maintained. In other words, connections or couplings may be modified as long as the general purpose and function of the connection or coupling remains essentially unaltered. In the context of this application, unless specifically noted otherwise, terms like "connection", "coupling", "connected to" or "coupled to" relate to an electrical connection or coupling.

Embodiments relate to power converters which comprise a transformer and a capacitor coupled to a primary winding of the transformer. The leakage inductance of the primary winding and the capacitor, possibly together with further components like an additional inductor, form a LC resonator of the power converter, also referred to as LC tank or resonant tank (that oscillates at a resonant frequency). One example for such power converters are flyback converters. In case of flyback converters the LC resonator defines a resonant frequency of the converter. While flyback converters are used as examples for such power converters in the following, techniques discussed herein may also be applied to other converters using such an LC resonator, where the LC resonator is driven by one or more primary side switches, e.g. according to an asymmetric pulse width modulation scheme.

In embodiments, a voltage at the capacitor is used to supply at least parts of a controller of the power converter with power. In particular, as will be explained below, a voltage at the capacitor may have sufficiently small variations to make it suitable for a supply voltage. Further details and implementations will be described below. To this end, the capacitor may be coupled to a supply voltage terminal of the controller such that the controller is supplied by the voltage at the capacitor. This coupling may be direct, i.e. with a simple low-ohmic connection, or indirect, with additional elements like a diode or a linear regulator in between, as long as the controller is supplied by a voltage derived from the voltage at the capacitor.

Figure 1:
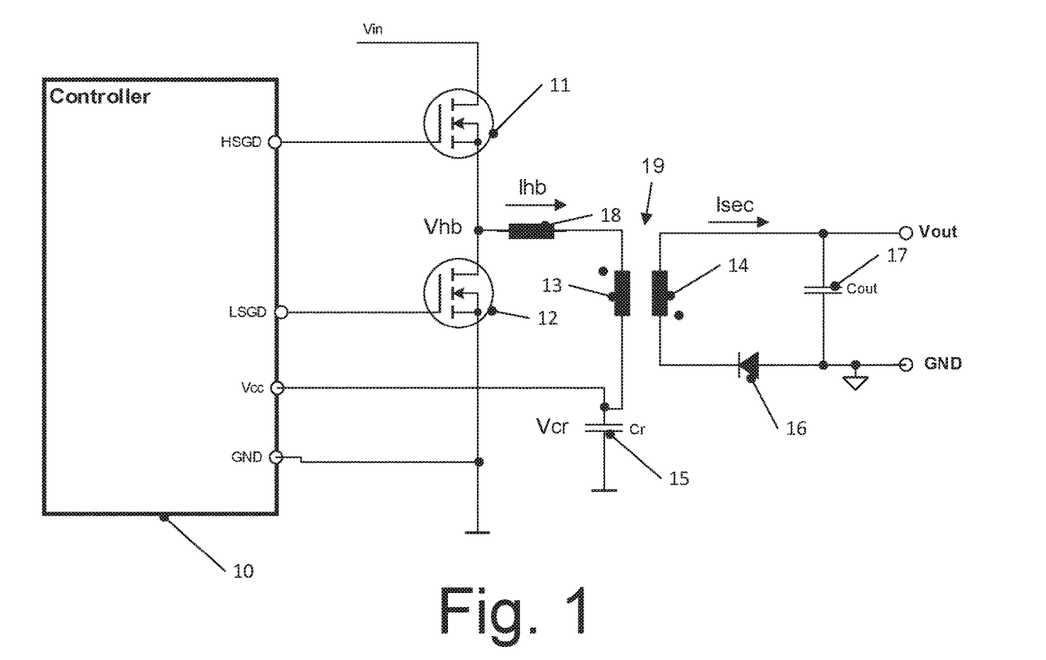
FIG. 1 is a circuit diagram of a flyback converter according to an embodiment.

Turning now to the drawings, FIG. 1 is a circuit diagram illustrating an APWM HB flyback converter according to an embodiment. The APWM HB flyback converter of FIG. 1 comprises a controller 10 controlling a high-side switch 11 and a low-side switch 12 via output terminals HSGD, LSGD, respectively. High-side switch 11 and low-side switch 12 are also referred to as primary side switches. In other implementations, only single primary side switch may be provided. In the embodiment shown, high-side switch 11 and low-side switch 12 are NMOS transistors. However, in other embodiments, other types of switches, for example other types of transistors may be used.

For the following explanation, a switch is referred to as "on" or "closed" when it provides a low-ohmic connection (such as a short circuit) between terminals thereof and is referred to as "off" or "open" in a state where it provides essentially an electric isolation (such as an open circuit) between the terminals (apart possibly from some leakage current). Apart from NMOS transistors as shown in FIG. 1, other types of field effect transistors like PMOS transistors, bipolar junction transistors or insulated gate bipolar transistors are examples for switches usable in embodiments.

High-side switch 11 and low-side switch 12 are coupled in series between a node to which in operation a direct current (DC) input voltage Vin is applied and a reference voltage, for example ground, as shown. In some embodiments, input voltage Vin as in conventional flyback converters, may be generated based on an AC input voltage using a rectifier. This is just one example of additional features conventionally used in power converters like voltage converters which may also be implemented in embodiments discussed herein.

Controller 10 is operative to control high-side switch 11 and low-side switch 12 via output terminals HSGD and LSGD according to any conventional techniques used in power converters like voltage converters. For example, an on-time of high-side switch 11 or low-side switch 12 may be modified depending on an output voltage Vout of the flyback converter of FIG. 1, based on an output current or based on any other feedback information in any conventional manner.

In particular, techniques like zero voltage switching (ZVS) may be employed when controlling high-side switch 11 and low-side switch 12.

A node between switches 11, 12 is coupled to a first end of a primary winding 13 of a transformer 19. A second end of primary winding 13 is coupled to ground via a capacitor 15 having a capacitance Cr.

Transformer 19 further comprises a secondary winding 14. Dots at primary winding 13 and secondary winding 14 denote a winding direction. Therefore, in the embodiment of FIG. 1, primary winding 13 and secondary winding 14 have opposite winding directions. A first end of secondary winding 14 is coupled to a first output terminal to output the voltage Vout. A second end of secondary winding 14 is coupled to a second output terminal (ground output terminal) via a diode 16. Furthermore, an output capacitor 17 having a capacitance Cout is coupled between the first and second output terminals as shown, acting essentially as a filter.

A leakage inductance of transformer 19, in particular of primary winding 13 and capacitor 15 form an LC resonator which influences the behavior of the flyback converter. In some embodiments, an additional, optional, inductor 18 may be provided as part of the LC resonator. This LC resonator is also referred to as resonant tank.

Capacitance Cr may for example be in the order of Nanofarad (nF) or above, for example at least 1 nF, or at least 10 nF, or some 100 nF, but is not limited thereto. Additionally, capacitance Cr may be smaller than 1 mF in some implementations. Generally, when the converter is used in a resonant way (using the resonances discussed below with reference to FIG. 3), the capacitance Cr determines the resonance frequency fres according to fres=1/(2·Π·SQRT(L·Cr)), where SQRT is the square route function, L is the leakage inductivity of transformer 19 (plus the inductivity of inductor 18, if this optional inductor is provided), such that for a predetermined resonance frequency fres the value Cr may be selected appropriately. When the converter is not used in a resonant way, Cr may also have larger values.

As described above, the flyback converter of FIG. 1 corresponds to a conventional flyback controller, and modifications and variations are possible corresponding to variations and modifications known for conventional flyback converters. Unlike conventional flyback converters, in the embodiment of FIG. 1, controller 10 is supplied using a voltage at capacitor 15. In particular, a supply voltage input Vcc of controller 10 is coupled to a node between capacitor 15 and primary winding 13, and a ground terminal GND of controller 10 is coupled to ground. As capacitor 15 is also coupled to ground, this means that the voltage between the terminals Vcc and GND of controller 10 correspond to a voltage Vcr across capacitor 15. This voltage serves as a supply voltage for controller 10 supplying one or more components of controller 10 with power. Supply voltage, as used herein, is to be taken in the common meaning of the word as a voltage supplying an electric circuit with power necessary for operation, and is to be distinguished from an input signal (which may also be a voltage signal) which carries information that is processed within controller 10. This does not exclude that the supply voltage to controller 10 may also carry some information that is used, but that would be a function in addition to the function as supply voltage, which is optional.

By using a voltage at or across capacitor 15 as a supply voltage, for example no auxiliary winding may be needed to generate a supply voltage, and no external supply voltage may be needed. In other embodiments, as will be discussed later, a number of auxiliary windings may be reduced.

Figure 2:
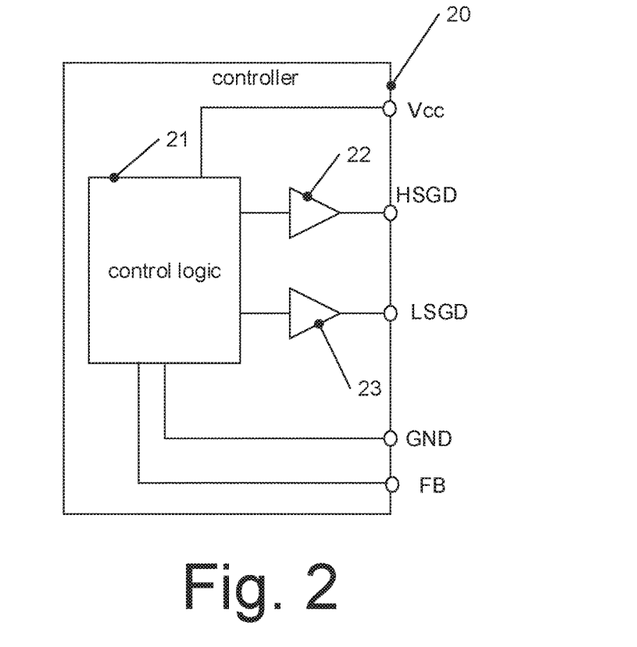
FIG. 2 is a diagram of a controller according to an embodiment.

FIG. 2 illustrates a schematic diagram of a controller 20, which is an example for controller 10 of FIG. 1, according to an embodiment. Controller 20 of FIG. 2 comprises a control logic 21. Control logic 21 may comprise one or more logic circuits, one or more application-specific integrated circuits (ASICs), or parts thereof, field programmable gate arrays, one or more processors and/or other control circuits. Control logic 21 in the embodiment of FIG. 2 receives one or more feedback signals via a terminal FB. The feedback signals may for example be signals indicating an output voltage of a flyback converter or an output load of the flyback converter. Any feedback signals also used in conventional flyback converters, based on which the flyback converter is controlled, may be used.

In response to the feedback signals, control logic 21 controls a high-side driver 22 to output a control signal for a high-side switch like high-side switch 11 via output terminal HSGD, and a low-side driver 23 to output a control signal to a low-side switch like low-side switch 12 of FIG. 1 via terminal LSGD. In particular, for operating an APWM HB flyback converter high-side switch and low-side switch are switched on and off in an alternating manner with dead times (times where both switches are off) in-between.

In the embodiment of FIG. 2, control logic is supplied by a supply voltage from terminals Vcc, GND. In case of the embodiment of FIG. 1, terminal Vcc is coupled to capacitor 15 as shown in FIG. 1, and terminal GND is coupled to ground. In this way, control logic 21 is supplied with power to perform the control briefly described above and control in particular high-side driver 22 and low-side driver 23. In other embodiments, additionally or alternatively high-side driver 22 and/or low-side driver 23 may be supplied by a supply voltage received at terminal Vcc. In other embodiments, high-side driver 22 may be supplied by an additional circuit like a bootstrap circuit to generate an appropriate voltage. In yet other embodiments, further supply voltage terminals may be provided to supply high-side driver 22 and/or low-side driver 23. Nevertheless, in embodiments described herein, at least part of controller 20 is supplied by a supply voltage derived from a node coupled to a capacitor of an LC resonator of the flyback converter, like capacitor 15 of FIG. 1.

Before further embodiments of flyback converters will be described referring to FIGS. 5-9, an example operation of the embodiment of FIG. 1 will be briefly described referring to FIGS. 3 and 4.

Figure 3:
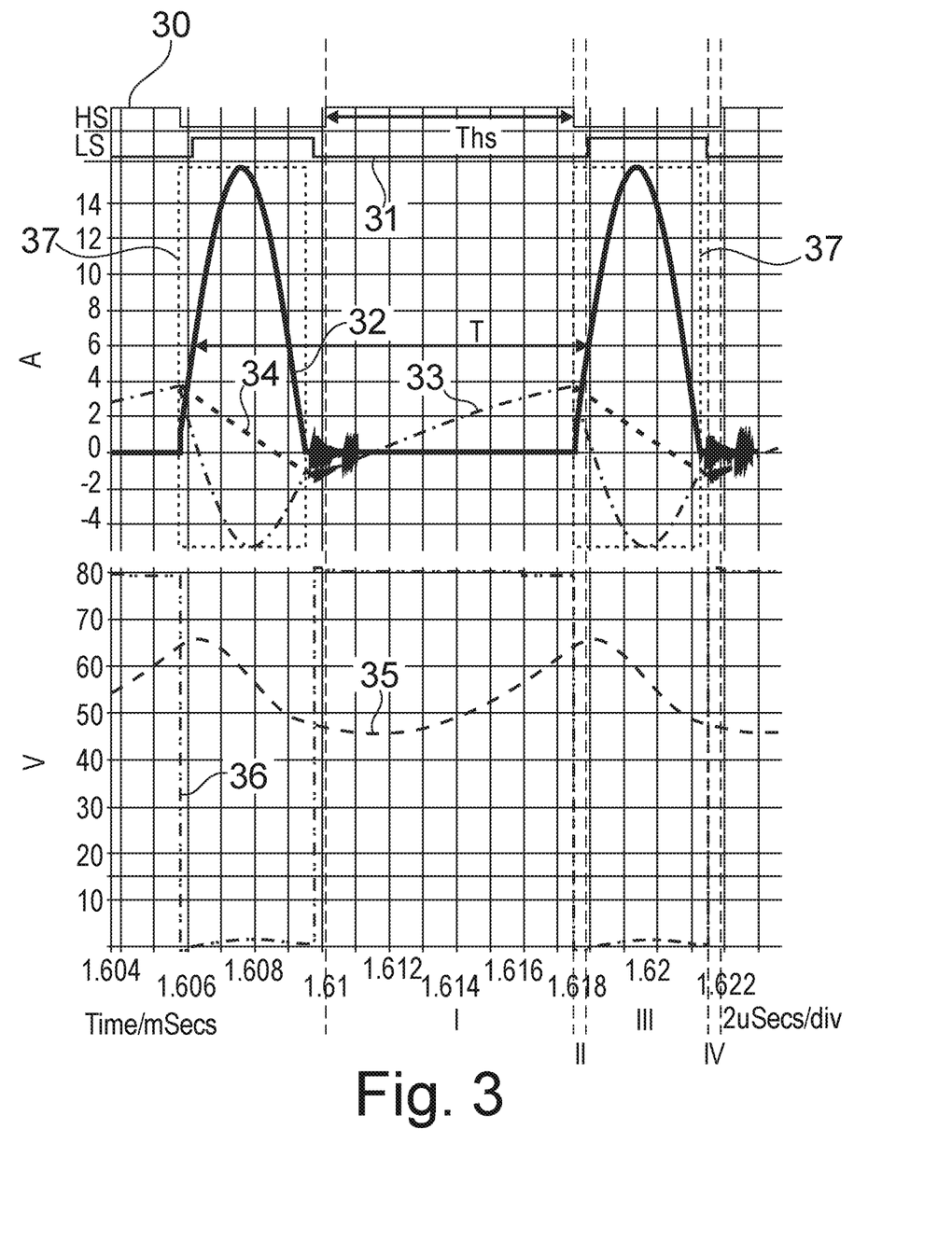
FIG. 3 is a diagram for illustrating operation of the flyback converter of FIG. 1.

FIG. 3 illustrates various currents and voltages in an example operation of the embodiment of FIG. 1. A curve 30 illustrates an example switching of high-side switch 11, and a curve 31 illustrates an example switching of low-side switch 12, a high level of curves 30, 31 indicating that the respective switch is closed, and a low level indication that the respective switch is open. As can be seen, high-side switch 11 and low-side switch 12 are open and closed in an alternating manner periodically. A period length of the switching is denoted T in FIG. 3, and an on-time of high-side switch 11 is denoted Ths.

A curve 32 illustrates a secondary current Isec flowing on a secondary side from secondary winding 14 to the terminal outputting voltage Vout, and a curve 33 illustrates a current Ihb flowing from the node between high-side switch 11 and low-side switch 12 to the first end of primary winding 13. A curve 34 illustrates a magnetizing current in transformer 19, a curve 35 illustrates voltage Vcr across capacitor 15 (corresponding to the supply voltage supplied to controller 10 in FIG. 1) and a curve 36 illustrates a voltage Vhb at the above-mentioned node between high-side switch 11 and low-side switch 12. Some of the voltages and currents mentioned above are also denoted in FIG. 1.

When operating the flyback converter at or near a resonance frequency of the above-mentioned LC resonator, a resonance occurs which is visible in a box 37 in FIG. 3, in particular in curves 32 (Isec) and 33 (Ihb).

Before supplying the controller 10 with voltage Vcr will be discussed in some more detail, for completeness' sake the general operation of the flyback converter of FIG. 1 will be explained.

In an operation phase I, high-side switch 11 is on, and low-side switch 12 is off. Therefore, the input voltage Vin is applied to the first end of primary winding 13 of transformer 19 and to capacitor 15. Current Ihb increases as can be seen in curve 33, and capacitor 15 is charged, leading to increasing Vcr during this period. Current Isec during this period is negligible as during this phase diode 16 is reversed biased.

In an operation phase II, both switches 11, 12 are off, also referred to as dead time. The inductance of transformer 19 forces the current built during operation phase I to keep flowing, magnetizing current Im decreasing slowly and current Ihb decreasing more steeply at the beginning of phase II. As both switches 11, 12 are off, voltage Vhb decreases (charging/discharging parasitic capacitances, also referred to as output capacitances, of switches 11, 12) until voltage Vhb is clamped by a parasitic diode of low-side switch 12.

In an operation phase III, high-side switch 11 is off while low-side switch 12 is turned on. Vcr continues to decrease. Isec and Ihb show a sinusoidal shape caused by the mentioned resonance. In particular, the voltage in the transformer secondary winding 14 is inverted compared to operation phase I, forward biasing diode 16. Secondary current Isec starts increasing, and this secondary current is reflected to the primary side and added to the magnetizing current.

As can be seen, when low-side switch 12 switches on, so-called zero voltage switching is achieved, as the voltage Vhb is zero when the low-side switch switches on.

In an operation phase IV, both switches 11, 12 are off, also referred to as dead time. Somewhat similar to operation phase II, the current built in transformer T1 forces Vhb to increase until a body diode of high-side switch clamps the voltage. This in embodiments allows zero voltage switching of high-side switch 11 when again going to operation phase I, where high-side switch 11 is turned on.

As mentioned, curve 35 denotes that voltage across capacitor 15, which essentially is used as supply voltage at terminal Vcc of controller 10. As can be seen, while this voltage varies, in the example of FIG. 3, the voltage is always above about 45 V and below about 65 V, such that by designing circuits of controller 10 accordingly, this voltage may be used as a supply voltage.

In this respect, it should be noted that the average voltage Vcr depends on the output voltage Vout according to $$<Vcr> = N*Vout,$$

where N is the transformer winding ratio of transformer 19 Np/Ns, where Np is the number of windings of primary winding 13 and Ns is the number of windings of secondary winding 14, and <Vcr> is the average value of voltage Vcr. This means that when the output voltage is for example held constant by a feedback mechanism as in many conventional flyback converters and as briefly mentioned with respect to FIGS. 1 and 2, the average value of the voltage Vcr also remains constant, which improves usability as supply voltage.

Figure 4:
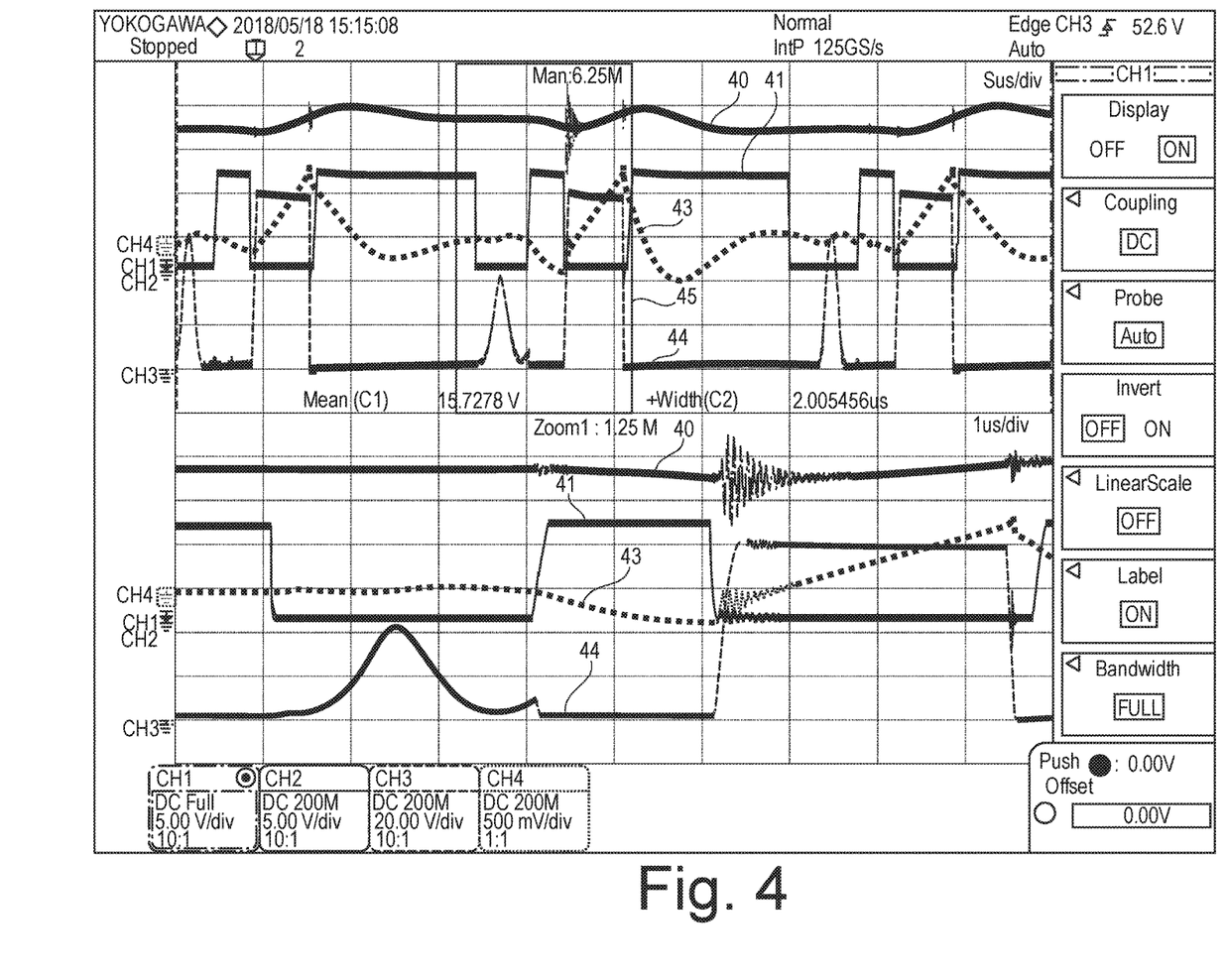
FIG. 4 shows measurement results for a flyback converter according to an embodiment.

For further illustration, FIG. 4 shows measurement results for an actual implementation of the converter of FIG. 1. In an upper part of FIG. 4, curves 40-44 are shown, and in a lower part of FIG. 4, magnified versions of curves 40-44 within a box 45 of the upper part are shown. Curve 40 shows the voltage Vcr across capacitor 15, a curve 43 shows a current Icr charging/discharging capacitor 15. Curve 41 shows the control signal for low-side switch 12 (output LSGD), and curve 44 illustrates the voltage Vhb. In this particular implementation, the voltage Vcr has an average (mean) value of 15.7278 V, with comparatively small variations. It should be noted that the value of Vcr, as mentioned above, depends on both the output voltage Vout, which the converter is designed for and the winding ratio N, according to the above equation, such that different voltages like between 40 V and 70 V in FIG. 3 or around 16 V in FIG. 4 may occur.

Further embodiments will now be described referring to FIGS. 5-9. The embodiments of FIGS. 5-9 are variations of the embodiment of FIG. 1, and in order to avoid repetitions, corresponding elements bear the same reference numerals and will not be described again in detail repeatedly. It should be noted that this does not imply that the elements have to be absolutely identical. For example, as will be explained below, capacitor 15 may be connected to primary winding 13 of transformer 19 and to switches 11, 12 in different manners, but as this capacitors always serves as the capacitor for the LC resonator, it always bears reference numeral 15. Such modifications, however, together with all other additions and variations compared to the embodiment of FIG. 1 will be described in detail below.

Figure 5:
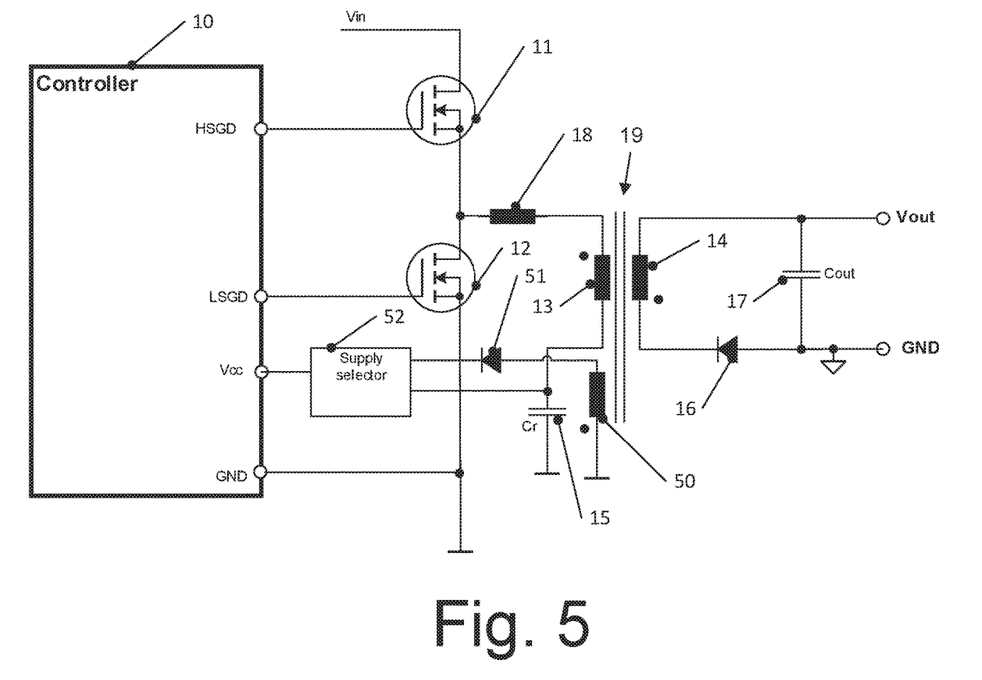
FIGS. 5-9 illustrate flyback converters according to other embodiments.

In the embodiment of FIG. 5, transformer 19 comprises an auxiliary winding 50, which has the same winding orientation as secondary winding 14 and different orientation from primary winding 13. Auxiliary winding 50 may also be used to generate a supply voltage for controller 10. The embodiment of FIG. 5 may for example be used in converters where different output voltages Vout may be generated by the voltage converter. As explained above, the voltage across capacitor 15 is directly related to the output voltage Vout via the turning ratio of transformer 19. For varying output voltages this may mean that not for all output voltages the voltage across capacitor 15 is suitable as a supply voltage for controller 10. Therefore, a voltage at capacitor 15 is provided to a supply selector circuit 52, and additionally a voltage at secondary winding 50 is provided to supply selector circuit 52 via a diode 51. Supply selector circuit 52 essentially is a multiplexer and selects either the voltage at capacitor 15 as supply voltage (so that controller 10 is supplied by the voltage at capacitor 15 as explained for the embodiment of FIG. 1) or the voltage from auxiliary winding 50 as supply voltage to be supplied to terminal Vcc. For example, for a first range of output voltages Vout, the voltage at capacitor 15 may be selected, and for a second range of output voltages Vout different from the first range, the voltage at auxiliary winding 50 may be selected. Auxiliary winding 50 may be dimensioned (number of windings) so that in both cases a suitable supply voltage is provided to controller 10. In some conventional cases, two auxiliary windings may be necessary in such cases, so in some embodiments, the number of auxiliary windings necessary may be reduced by using a voltage at capacitor 15 as selectable supply voltage.

Figure 6:
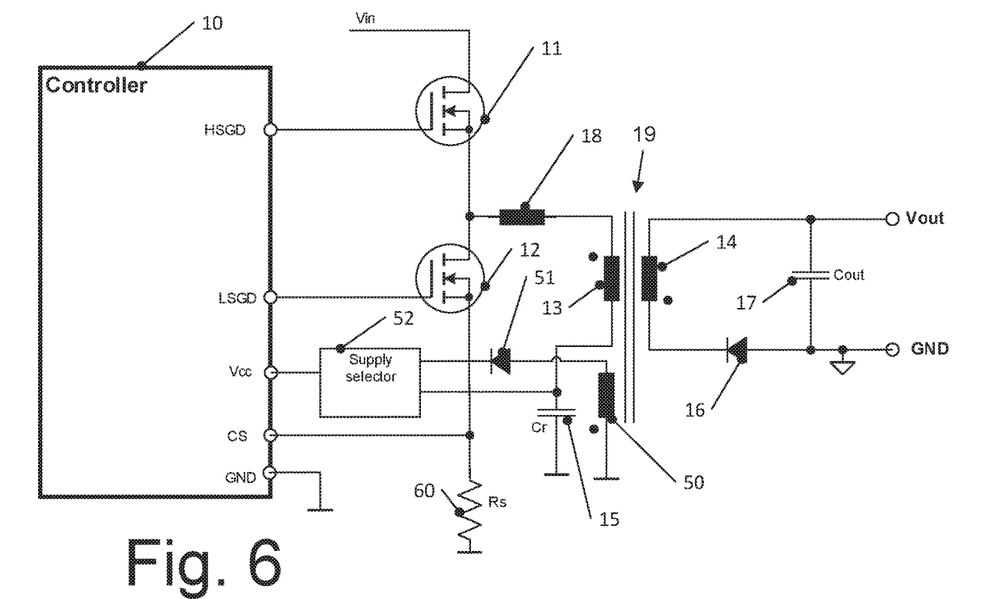

FIG. 6 illustrates an embodiment with an additional current sensing shunt resistor 60 having a resistance Rs coupled between low-side switch 12 and ground. A node between shunt resistor 60 and low-side switch 12 is coupled to a current sensing terminal Cs of controller 10. A voltage at terminal Cs is therefore indicative of a current flowing via low-side switch 12. This may be used for example as a feedback signal for controlling switching of switches 11, 12 or also for other purposes like overcurrent protection. Otherwise, the embodiment of FIG. 6 corresponds to the embodiment of FIG. 5. It should be noted that such a shunt resistor may also be provided in the embodiment of FIG. 1, which is an example for applying a variation for one embodiment (the embodiment of FIG. 5) also to other embodiments (the embodiment of FIG. 1), which, as mentioned initially, is within the scope of the present application.

Figure 7:
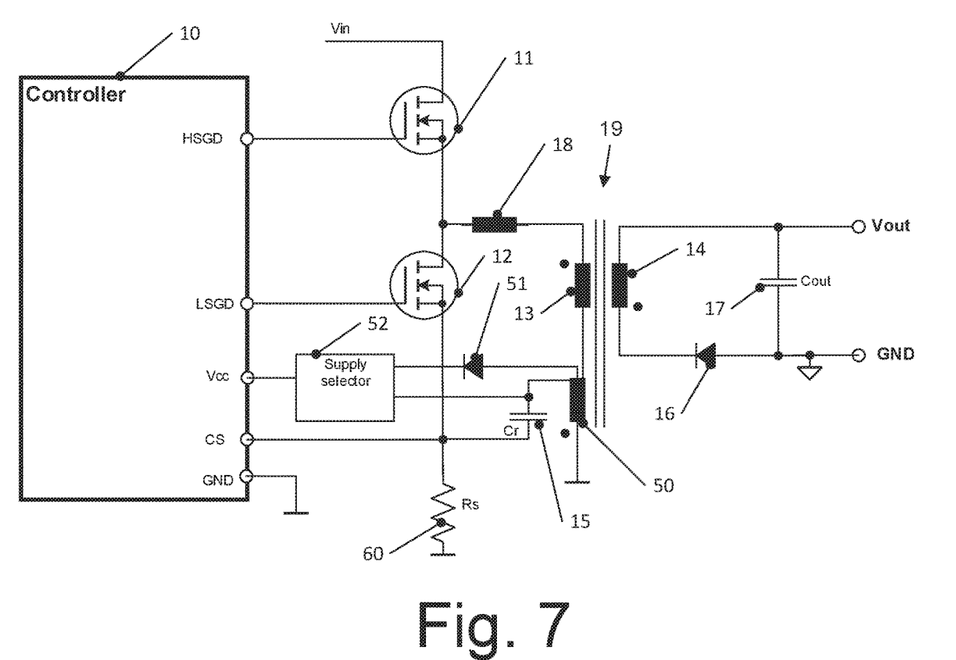

It should be noted that the shunt resistor 60 may also be connected in other manners. An example is shown in FIG. 7, where shunt resistor 60 is coupled between capacitor 15 and ground. Otherwise, the embodiment of FIG. 7 corresponds to the embodiment of FIG. 6.

In the embodiments of FIGS. 1, 5, 6 and 7, primary winding 13 and capacitor 15 are coupled in series between a node between switches 11, 12 and ground. In other embodiments, primary winding 13 and capacitor 15 may be coupled between the input voltage Vin and the node between high-side switch 11 and low-side switch 12. An example for such an embodiment is shown in FIG. 8.

In such a configuration, the roles of high-side switch 11 and low-side switch 12 regarding operation of the converter may be reversed. In the embodiment of FIG. 8, controller 10 is again supplied by a voltage across capacitor 15. A first terminal of capacitor 15 which also receives the input voltage Vin is coupled to terminal Vcc of controller 10, and a second terminal of capacitor 15 which is also coupled to primary winding 13 is coupled to a terminal IC GND of controller 10, serving as internal ground or reference potential for the voltage supply of controller 10. This ground is different from the ground of the complete circuit (for example ground to which low-side switch 12 is connected, hence the name IC GND).

In order to provide a separation between this internal ground of controller 10 and external ground, isolation barriers 80 are provided between terminals HSGD, LSGD and switches 11, 12. Such isolation barriers 80 may for example provide a DC isolation using optocouplers or pulse transformers. In particular, as can be seen also the IC GND is isolated from source terminals of switches 11, 12. One reason for this is that in some implementations switches 11, 12 need a gate-source voltage of 0 to be open and of between 5V and 15V to be fully closed, and so ensure correct switch control, isolation barriers 80 are provided.

Figure 8:
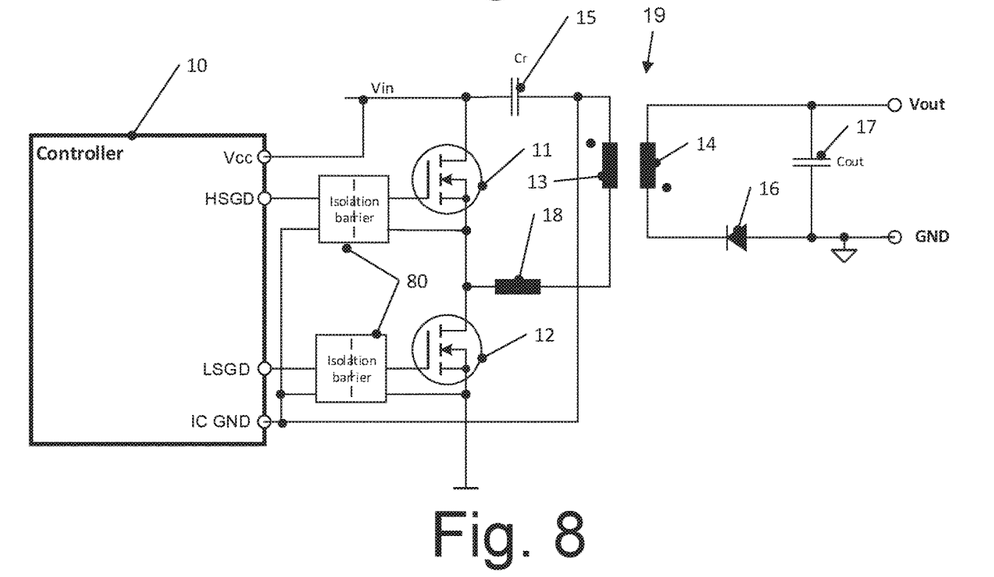

It should be noted that also in the embodiment of FIG. 8, an auxiliary winding like auxiliary winding 50 together with a supply selector like supply selector circuit 52 may be provided.

In the embodiments discussed with reference to FIGS. 1 and 5-8, a supply voltage is generated at terminal Vcc of controller 10 which, as shown in FIG. 2, may in particular be used to supply a control logic of controller 10 with power. As already mentioned with respect to FIG. 2, in other embodiments, also a driver like high-side driver 22 of FIG. 2 may be supplied with power using a voltage at capacitor 15. A corresponding embodiment is shown in FIG. 9.

Figure 9:
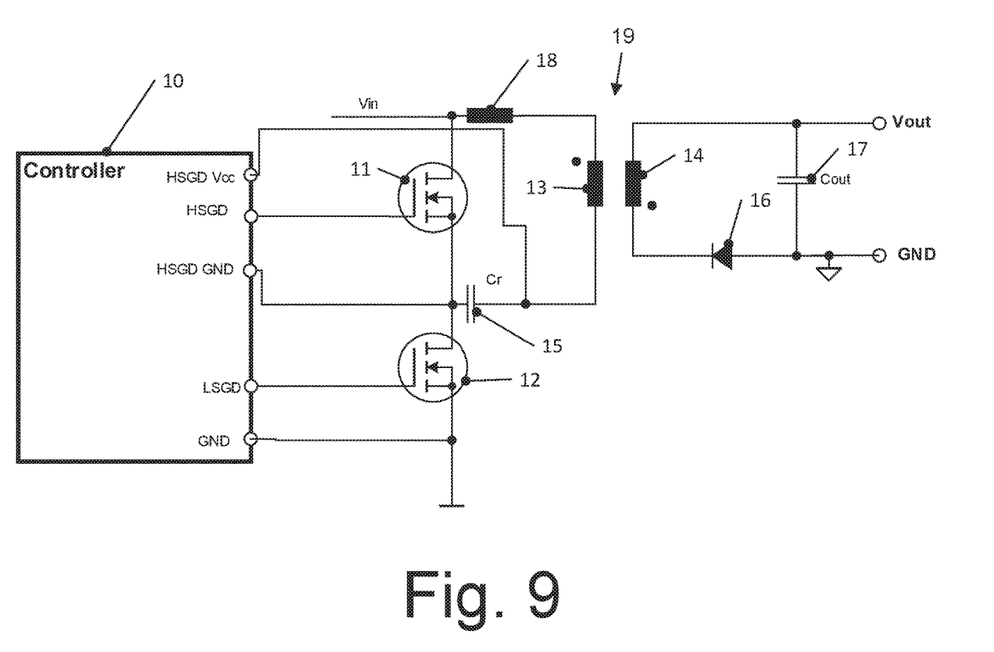

In the embodiment of FIG. 9, capacitor 15 is coupled between the node between switches 11, 12 on the one hand and primary winding 13 on the other hand. Furthermore, the node between switches 11, 12 is coupled to a terminal HSGD GND of controller 10, and a node between capacitor 15 and primary winding 13 is coupled to a terminal HSGD Vcc of controller 10. A voltage between terminal HSGD Vcc and terminal HSGD GND is used in controller 10 to supply a high-side driver, for example high-side driver 22 of FIG. 2. In such a case, no additional circuitry like a bootstrap circuit is needed for supplying the high-side driver. Other components of controller 10, for example a control logic, may then be supplied in any conventional manner, or a supply voltage for such components may be derived from the voltage at terminal HSGD Vcc internally in controller 10.

Therefore, as can be seen from the above-mentioned embodiment, various possibilities exist for using a voltage at a capacitor of an LC resonator which is coupled to a primary winding of a transformer of a voltage converter to provide a supply voltage to a controller of the voltage converter.

It should be noted that APWM HB flyback converters are only a non-limiting example used for illustration purposes, and the techniques described herein may be generally applied to converters where a capacitor is coupled to a primary winding of a transformer of a converter.

Some embodiments are defined by the following examples.

Example 1. A power converter, comprising:
at least one primary side switch (11, 12),
a transformer, wherein a primary winding (13) of the transformer (19) is coupled to the at least one primary side switch (11, 12), and wherein a secondary winding (14) of the transformer (19) is coupled to an output of the power converter,
a capacitor (15) coupled to the primary winding (13), wherein an LC resonator of the power converter includes the capacitor (15) and a leakage inductivity of the transformer (19), and
a controller (10) operative to control switching of the at least one primary side switch (11, 12), wherein the controller (10) includes a supply voltage terminal (Vcc) operative to receive a supply voltage supplying at least part of the controller (10) with power, wherein the supply voltage terminal (Vcc) is coupled to the capacitor (15).

Example 2. The power converter of example 1, wherein the supply voltage terminal (Vcc) of the controller (10) is coupled to a first terminal of the capacitor (15), wherein a reference voltage terminal (GND) of the controller (10) is coupled to a reference potential, wherein a second terminal of the capacitor (15) is coupled to the reference potential.

Example 3. The power converter of example 1, wherein a first terminal of the capacitor (15) is coupled to the supply voltage input, and a second terminal of the capacitor (15) is coupled to a reference voltage terminal (IC GND) of the controller (10).

Example 4. The power converter of example 1, wherein the at least one switch (11, 12) comprises a high-side switch (11) coupled between an input voltage (Vin) node and an intermediate node, and a low-side switch (12) coupled between the node and a reference potential,
wherein a first end of the primary winding (13) is coupled to the intermediate node.

Example 5. The power converter of example 4, wherein the capacitor (15) is coupled between the second end of the primary winding (13) and the reference potential, and wherein a further node between the primary winding (13) and the capacitor (15) is coupled to the supply voltage input (Vcc).

Example 6. The power converter of example 4 or 5, further comprising a shunt resistor (60) coupled between the low-side switch (12) and the reference potential.

Example 7. The power converter of example 6, wherein the capacitor (15) is coupled to a node between the low-side switch (12) and the shunt resistor (60).

Example 8. The power converter of example 4, wherein a second end of the primary winding (13) is coupled to a first terminal of the capacitor (15), wherein an second terminal of the capacitor (15) is coupled to the input voltage (Vin) node and the supply voltage terminal (Vcc), wherein the first end of the capacitor (15) is coupled to a reference voltage terminal (IC GND) of the controller (10).

Example 9. The power converter of example 8, further comprising an isolation barrier (80) between the controller and the at least one primary side switch (11, 12).

Example 10. The power converter of example 4, wherein the capacitor (15) is coupled between the intermediate node and the first end of the primary winding (13), wherein a second end of the primary winding (13) is coupled to the input voltage (Vin) node, wherein a further node between the capacitor (15) and the primary winding (13) is coupled to the supply voltage terminal (Vcc), wherein the node is coupled to a reference voltage terminal (HSGD GND) of the controller (10), and wherein the at least part of the controller (10) comprises a high-side driver (22) of the controller.

Example 11. The power converter of any one of examples 4-10, wherein the reference potential is ground.

Example 12. The power converter of any one of examples 1-11, wherein the transformer (19) additionally comprises an auxiliary winding (50), and wherein the power converter further comprises a supply selector circuit (52) operative to selectively couple the capacitor (15) or the auxiliary winding (50) to the supply voltage terminal (Vcc).

Example 13. The power converter of example 12, wherein the supply selector circuit (52) is operative to selectively couple the capacitor (15) or the auxiliary winding (50) to the supply voltage terminal (Vcc) based on an output voltage (Vout) of the power converter.

Example 14. The power converter of any one of examples 1-13, wherein the power converter is a flyback converter.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A power converter comprising:
a first primary side switch;
a transformer including a primary winding inductively coupled to a secondary winding, the primary winding of the transformer being coupled to the first primary side switch, the secondary winding of the transformer being coupled to an output of the power converter;
a capacitor disposed in series with the primary winding, an LC resonator of the power converter including the capacitor and an inductance of the primary winding of the transformer; and
a controller operative to control switching of the first primary side switch ON and OFF, the controller including a supply voltage input terminal operative to receive a supply voltage from the capacitor connected to the primary winding, the supply voltage from the capacitor operative to power the controller; and wherein a first terminal of the capacitor is coupled to the supply voltage input terminal; and wherein a second terminal of the capacitor is coupled to a reference voltage terminal of the controller.

2. The power converter of claim 1, wherein the reference voltage terminal of the controller is coupled to a reference voltage potential; wherein the first terminal of the capacitor is operative to supply the supply voltage to the supply voltage input terminal; and wherein the second terminal of the capacitor is coupled to the reference voltage potential.

3. The power converter of claim 1, wherein the first primary side switch is a high-side switch coupled between an input voltage source and an intermediate node;

wherein a low-side switch is coupled between the intermediate node and a reference voltage potential; and wherein a first end of the primary winding is coupled to the intermediate node.

4. The power converter of claim 3, wherein the capacitor is coupled between a second end of the primary winding and the reference voltage potential.

5. The power converter of claim 3 further comprising a shunt resistor coupled between the low-side switch and the reference voltage potential.

6. The power converter of claim 5, wherein the capacitor is coupled to a circuit node connecting the low-side switch and the shunt resistor.

7. The power converter of claim 3, wherein a second end of the primary winding is coupled to the first terminal of the capacitor; and wherein the second terminal of the capacitor is coupled to the input voltage source and the supply voltage input terminal.

8. The power converter of claim 7 further comprising an isolation barrier disposed between the controller and the first primary side switch.

9. The power converter of claim 1, wherein the transformer additionally comprises an auxiliary winding inductively coupled to the primary winding; and wherein the power converter further comprises a supply selector circuit operative to selectively switch between coupling the supply voltage supplied from the capacitor and an auxiliary voltage generated by the auxiliary winding to power the supply voltage input terminal.

10. The power converter of claim 9, wherein the supply selector circuit is operative to switch between connecting the capacitor and the auxiliary winding to the supply voltage input terminal based on an output voltage outputted from the output of the power converter.

11. The power converter of claim 1, wherein the power converter is a flyback converter.

12. The power converter of claim 1 further comprising:
an inductor component disposed in series with the primary winding and the first primary side switch, a combination of an inductance of the inductor component and the inductance of the primary winding being part of the LC resonator of the power converter, the combination defining a resonant frequency of the power converter.

13. The power converter of claim 1 further comprising:
a controller operative to adjust a timing of activating the first primary side switch depending on a magnitude of an output voltage generated from the secondary winding.

14. The power converter of claim 1 further comprising:
a second primary side switch, the second primary side switch connected in series with the first primary side switch.

15. The power converter of claim 14, wherein a series combination of the primary winding and the capacitor are disposed in parallel with the second primary side switch.

16. The power converter of claim 15 further comprising:
a controller operative to adjust a timing of activating the first primary side switch and the second primary side switch depending on a magnitude of an output voltage generated from the secondary winding.

17. The power converter of claim 16 further comprising:
an auxiliary winding inductively coupled to the primary winding; and
a supply selector circuit operative to selectively switch between coupling the supply voltage from the capacitor and an auxiliary voltage generated by the auxiliary winding to power the supply voltage input terminal.

18. The power converter of claim 1, wherein a combination of the capacitor and the primary winding are disposed in parallel with the first primary side switch.

19. The power converter of claim 18 further comprising:
a second primary side switch disposed in series with the first primary side switch, a combination of the first primary side switch and the second primary side switch connected between a first reference voltage and a second reference voltage.

20. The power converter of claim 19, wherein the first terminal of the capacitor is connected to a node coupling the first primary side switch and the second primary side switch.

21. The power converter of claim 1, wherein the primary side switch controls a flow of current through the primary winding, the controlled flow of current through the primary winding operative to: i) produce an output voltage from the secondary winding, and ii) produce the supply voltage, the supply voltage stored in the capacitor.

22. The power converter of claim 1, wherein a magnitude of the supply voltage is substantially constant.

23. The power converter of claim 1, wherein the capacitor is connected in parallel with the controller.

24. An apparatus comprising:
a controller operative to:
control switching of a first switch of a power converter ON and OFF, the power converter including a transformer, the transformer including a primary winding inductively coupled to a secondary winding, the primary winding of the transformer being coupled to the first switch, the secondary winding of the transformer being coupled to an output of the power converter;
via the controlled switching, control resonance operation of an LC resonator of the power converter, the LC resonator including a capacitor of the power converter and the primary winding disposed in series, the resonance of the LC resonator producing a supply voltage stored in the capacitor;
receive, via a supply voltage input terminal, the supply voltage stored in the capacitor;
wherein a first terminal of the capacitor is coupled to the supply voltage input terminal; and
wherein a second terminal of the capacitor is coupled to a reference voltage terminal of the controller.

25. A method comprising:
switching a first switch of a power converter ON and OFF, the power converter including a transformer, the transformer including a primary winding inductively coupled to a secondary winding, the primary winding of the transformer being coupled to the first switch, the secondary winding of the transformer being coupled to an output of the power converter;

via the switching, controlling resonance operation of an LC resonator of the power converter, the LC resonator including a capacitor and the primary winding disposed in series, the resonance of the LC resonator producing a supply voltage at a first node of the capacitor; and receiving, via a supply voltage input terminal, the supply voltage generated by the first node of the capacitor;

wherein the first node of the capacitor is coupled to the supply voltage input terminal; and wherein a second node of the capacitor is coupled to a reference voltage terminal of the controller.

* * * * *